United States Patent
Azriel et al.

(10) Patent No.: US 7,286,652 B1
(45) Date of Patent: Oct. 23, 2007

(54) FOUR CHANNEL AUDIO RECORDING IN A PACKET BASED NETWORK

(75) Inventors: Gad Azriel, Holon (IL); Yackov Sfadya, Kfar Saba (IL)

(73) Assignee: 3Com Corporation, Marlborough, MA (US)

( * ) Notice: Subject to any disclaimer, the term of this patent is extended or adjusted under 35 U.S.C. 154(b) by 1606 days.

(21) Appl. No.: 09/584,581

(22) Filed: May 31, 2000

(51) Int. Cl.
*H04M 1/64* (2006.01)
*H04L 12/66* (2006.01)
*G06F 15/173* (2006.01)

(52) U.S. Cl. .................. 379/88.22; 370/352; 709/224
(58) Field of Classification Search .................. None
See application file for complete search history.

(56) References Cited

U.S. PATENT DOCUMENTS

| | | | | |
|---|---|---|---|---|
| 5,710,591 | A * | 1/1998 | Bruno et al. | 348/14.09 |
| 6,100,882 | A * | 8/2000 | Sharman et al. | 704/235 |
| 6,122,665 | A * | 9/2000 | Bar et al. | 709/224 |
| 6,487,196 | B1 * | 11/2002 | Verthein et al. | 370/352 |
| 6,614,781 | B1 * | 9/2003 | Elliott et al. | 370/352 |
| 6,850,609 | B1 * | 2/2005 | Schrage | 379/202.01 |
| 2001/0043571 | A1 * | 11/2001 | Jang et al. | 370/260 |

OTHER PUBLICATIONS

International Telecommunication Union, H.225.0, Annex A, RTP/RTCP, Feb. 1998, pp. 73-106.
International Telecommunication Union, H.323, Draft v4, Aug. 1999, Chapters 6 & 7, pp. 13-52.
Pocket Telephony Primer, 3COM Corporation, Mar. 1998.

* cited by examiner

*Primary Examiner*—Fan Tsang
*Assistant Examiner*—Joseph T Phan

(57) ABSTRACT

An apparatus for and a method of audio recording in packet based telephony systems. Using the present invention, the equivalent of four audio channels are recorded utilizing only two recording channels. Each channel recorded comprises the stream of packets generated and transmitted by each endpoint to the other side. The RTP packets include the samples generated by the particular endpoint in addition to the timestamp of the samples received from the other side actually played by the endpoint. The recording device has knowledge of what was played at the other endpoint in order to accurately playback the audio samples generated by and received from the other endpoint. The recording device receives a packet stream containing the audio generated on each endpoint and the timestamp of the packet from the other side that was played on the endpoint. The recording device can reconstruct from this data the audio signal that was actually played on each endpoint.

28 Claims, 11 Drawing Sheets

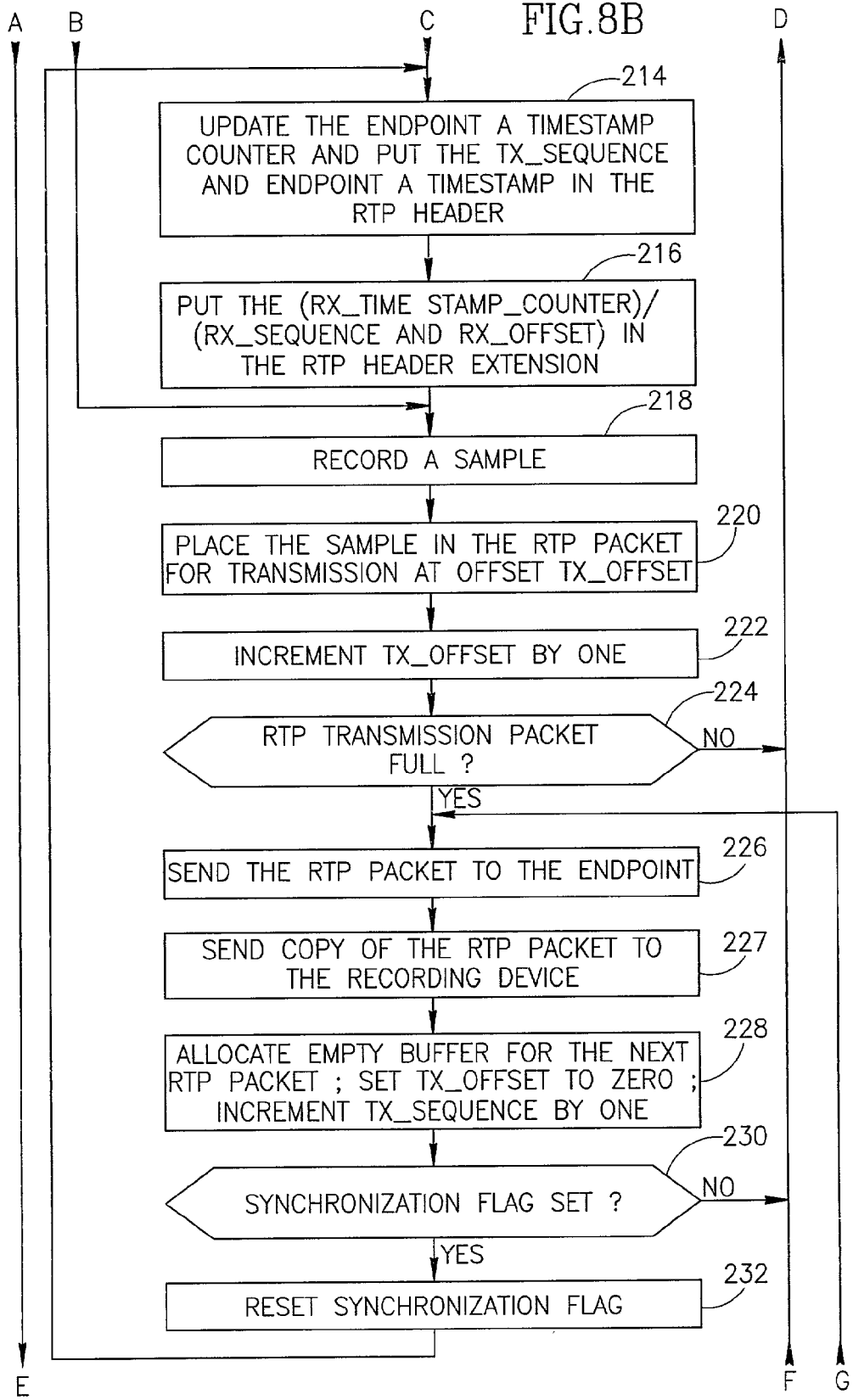

FOUR CHANNEL AUDIO RECORDING IN A PACKET BASED NETWORK

FIELD OF THE INVENTION

The present invention relates generally to voice over IP networks and more particularly relates to four-channel audio recording for use in a packet-based network.

BACKGROUND OF THE INVENTION

Separate Voice and Data Networks

Currently, there is a growing trend to converge voice and data networks so that both utilize the same network infrastructure. The currently available systems that combine voice and data have limited applications and scope. An example is Automatic Call Distribution (ACD), which permits service agents in call centers to access customer files in conjunction with incoming telephone calls. ACD centers, however, remain costly and difficult to deploy, requiring custom systems integration in most cases. Another example is the voice logging/auditing system used by emergency call centers (e.g., 911) and financial institutions. Deployment has been limited due to the limited scalability of the system since voice is on one network and data is on another, both tied together by awkward database linkages.

The aim of IP telephony is to provision voice over IP based networks in both the local area network (LAN) and the wide area network (WAN). Currently, voice and data generally flow over separate networks, the goal is to transmit them both over a single medium and on a single network.

A block diagram illustrating example separate prior art data and voice networks is shown in FIG. 1. The LAN portion, generally referenced 10, comprises the LAN cabling infrastructure, routers, switches and gateways 12 and one or more network devices connected to the LAN. Examples of typical network devices include servers 14, workstations 16 and printers. The voice portion, generally referenced 20, has at its core a private branch exchange (PBX) 24 which comprises one or more trunk line interfaces and one or more telephone and/or facsimile extension interfaces. The PBX is connected to the public switched telephone network (PSTN) 22 via one or more trunk lines 28, e.g., analog, T1, E1, T3, ISDN, etc. A plurality of user telephones 26 and one or more facsimile machines 27 are also connected directly to the PBX via phone line extensions 29.

The paradigm currently in wide spread use consists of circuit switched fabric 20 for voice networks and a completely separate LAN infrastructure 10 for data. Most enterprises today use proprietary PBX equipment for voice traffic.

Voice and Data Over a Shared Network

An increasingly common IP telephony paradigm consists of telephone and data tightly coupled on IP packet-based, switched, multimedia networks where voice and data share a common transport mechanism. It is expected that this paradigm will spur the development of a wealth of new applications that take advantage of the simultaneous delivery of voice and data over a single unified fabric.

A block diagram illustrating a voice over an IP network where voice and data share a common infrastructure is shown in FIG. 2. The IP telephony system, generally referenced 30, comprises, a LAN infrastructure represented by an Ethernet switch 32, a router, one or more telephones 36, workstations 34, a gateway 42, a gatekeeper 46, a PBX 33 with a LAN interface port and a Layer 3 switch 38. The key components of an IP telephony system 30 are the modified desktop, gatekeeper and gateway entities. For the desktop, users may have an Ethernet phone 36 that plugs into an Ethernet RJ-45 jack or a handset or headset 35 that plugs into a PC 37.

Today, all LAN based telephony systems need to connect to the PSTN 44. The gateway is the entity that is specifically designed to convert voice from the IP domain to the PSTN domain. The gatekeeper is primarily the IP telephony equivalent of the PBX in the PSTN world.

Typically, the IP telephony traffic is supported by a packet-based infrastructure such as an Ethernet network but a circuit-based infrastructure can be used as well with some provisions (e.g., ATM LAN emulation on ATM networks). Telephony calls traversing the intranet may pass through a Layer 3 switch 38 or a router (not shown) connecting a corporate intranet 40. The Layer 3 switch and the router should support Quality of Service (QoS) features such as IEEE 802.1p and 802.1Q and Resource Reservation Protocol (RSVP).

ITU-T Recommendation H.323

The International Telecommunications Union (ITU-T) Telecommunications Standardization Sector has issued a number of standards related to telecommunications. The Series H standards deals with audiovisual and multimedia systems and describes standards for systems and terminal equipment for audiovisual services. The H.323 standard is an umbrella standard that covers various audio and video encoding standards. Related standards include H.225.0 that covers media stream packetization and call signaling protocols and H.245 that covers audio and video capability exchange, management of logical channels and transport of control and indication signals. Details describing these standards can be found in ITU-T Recommendation H.323 (Draft 4 Aug. 1999), ITU-T Recommendation H.225.0 (February 1998) and ITU-T Recommendation H.245 (Jun. 3, 1999).

A block diagram illustrating example prior art H.323 compliant terminal equipment is shown in FIG. 3. The H.323 terminal 50 comprises a video codec 52, audio codec 54, system control 56 and H.225.0 layer 64. The system control comprises H.245 control 58, call control 60 and Registration, Admission and Status (RAS) control 62.

Attached video equipment 66 includes any type of video equipment, such as cameras and monitors including their control and selection, and various video processing equipment. Attached audio equipment 70 includes devices such as those providing voice activation sensing, microphones, loudspeakers, telephone instruments and microphone mixers. Data applications and associated user interfaces 72 such as those that use the T.120 real time audiographics conferencing standard or other data services over the data channel. The attached system control and user interface 74 provides the human user interface for system control. The network interface 68 provides the interface to the IP based network.

The video codec 52 functions to encode video signals from the video source (e.g., video camera) for transmission over the network and to decode the received video data for output to a video display. If a terminal incorporates video communications, it must be capable of encoding and decoding video information in accordance with H.261. A terminal may also optionally support encoding and decoding video in accordance with other recommendations such as H.263.

The audio codec 54 functions to encode audio signals from the audio source (e.g., microphone) for transmission over the network and to decode the received audio data for output to a loudspeaker. All H.323 audio terminals must be capable of encoding and decoding speech in accordance with G.711 including both A-law and μ-law encoding. Other types of audio that may be supported include G.722, G.723, G.728 and G.729.

The data channel supports telematic applications such as electronic whiteboards, still image transfer, file exchange, database access, real time audiographics conferencing (T.120), etc. The system control unit 56 provides services as defined in the H.245 and H.225.0 standards For example, the system control unit provides signaling for proper operation of the H.323 terminal, call control, capability exchange, signaling or commands and indications and messaging to describe the content of logical channels. The H.225.0 Layer 64 is operative to format the transmitted video, audio, data and control streams into messages for output to the network interface. It also functions to retrieve the received video, audio, data and control streams streams from messages received from the network interface 68.

The gateway functions to convert voice from the IP domain to the PSTN domain. In particular, it converts IP packetized voice to a format that can be accepted by the PSTN. The actual format depends on the type of media and protocol used for connecting to the PSTN (e.g., T1, E1, ISDN BRI, ISDN PRI, analog lines, etc.). The gateway provides the appropriate translation between different video, audio and data transmission formats and between different communications procedures and medias.

Note that since the digitization format for voice on the IP packet network is often different than on the PSTN, the gateway needs to provide this type of conversion that is known as transcoding. Note also that gateways also function to pass signaling information such as dial tone, busy tone, etc. Typical connections supported by the gateway include analog, T1, E1, ISDN, frame relay and ATM at OC-3 and higher rates. Additional functions performed by the gateway include call setup and clearing on both the network side and the PSTN side. The gateway may be omitted if communications with the PSTN is not required.

The gatekeeper functions to provide call control services, address translation services, call routing services, call authorization services, billing, bandwidth management and telephony supplementary services like call forwarding and call transfer to terminal endpoints on the network. It is primarily designed to be the IP telephony equivalent of the PBX. Logical endpoints register themselves with the gatekeeper before attempting to bring up a session. The gatekeeper may deny a request to bring up a session or may grant the request at a reduced data rate. This is particularly relevant to video connections that typically consume huge amounts of bandwidth for a high quality connection.

Call control signaling is optional as the gatekeeper may choose to complete the call signaling with the H.323 endpoints and process the call signaling or it may direct the endpoints to connect the call signaling channel directly to each other, thus the gatekeeper avoids handling the H.225.0 call control signals.

Through the use of H.225.0 signaling, the gatekeeper may reject calls from a terminal due to authorization failure. The reasons for rejection may include restricted access to or from particular terminals or gateways, or restricted access during certain time periods.

Bandwidth management entails controlling the number of H.323 terminals that are allowed to simultaneously access the network. Via H.225.0 signaling, the gatekeeper may reject calls from a terminal due to bandwidth limitations. This may occur if the gatekeeper determined that there is not sufficient bandwidth available on the network to support the call.

The call management function performed by the gatekeeper includes maintaining a list of currently active H.323 calls. This information is used to indicate that a terminal is busy and to provide information for the bandwidth management function.

The gatekeeper also provides address translation whereby an alias address is translated to a Transport Address. This is performed using a translation table that is updated using Registration messages, for example.

Real-Time Transport Protocol

The H.225.0 standard dictates the usage of the Real-Time Transport Protocol (RTP) which is defined by the IETF in RFC 1889 for conveying the data between the call endpoints and for monitoring the network congestion. The RTP protocol defines the RTP packet structure that includes two parts: the RTP packet header part and the RTP packet payload part. The RTP packet header includes several fields. Among those fields, are the payload type identification field, the sequence numbering field and the time stamping field. Typically, applications encapsulate RTP in a UDP packet. UDP/IP is an unreliable transport mechanism and therefore there is no guarantee that the RTP packet would reach its destination. RTP may, however, be used with other suitable underlying network or transport protocols.

RTP does not itself provide any mechanism to ensure timely delivery or other QoS guarantees, but relies on lower layer services to do so. It also does not guarantee delivery, nor does it assume that the underlying network is reliable and delivers packets in sequence. RTP includes sequence numbers and timestamps in the packet to allow the receiver to reconstruct the sender's packet sequence and timing.

RTP is intended to be flexible so as to provide the information required by a particular application. Unlike conventional protocols in which additional functions may be accommodated by making the protocol more general or by adding an option mechanism that required parsing, RTP can be tailored through modifications and/or additions to the headers.

The RTP Control Protocol (RTCP) functions to periodically transmit control packets to all participants in a session. The primary function of RTCP is to provide feedback on the quality of the data distribution that is useful for monitoring network congestion. The RTCP protocol is designed to monitor the quality of service and to convey information about the participants in an on-going session. RTCP also carries a transport level identifier for an RTP source called the canonical name or CNAME. Receivers require the CNAME to associate multiple data streams from a given participant in a set of related RTP sessions. The RTCP protocol can also be used to convey session control information such as participant identification. Each RTCP packet begins with a fixed header followed by structured elements of variable length. Note that the signaling/control information carried in the RTCP packets is transmitted using TCP/IP reliable protocol.

Also under the H.323 protocol umbrella are a number of standards for voice codecs including for example, G.711, G.729, G.729.1 and G.723.1.

Call Signaling

Call signaling encompasses the messages and procedures used to establish a call, request changes in bandwidth of the call, get status of the endpoints in the call and disconnect the call. Call signaling uses messages defined in the H.225.0 standard. In particular, the RAS signaling function uses H.225.0 messages to perform registration, admissions, bandwidth changes, status and disengage procedures between endpoints and Gatekeepers. The RAS Signaling Channel is independent from the Call Signaling Channel and the H.245 Control Channel.

Each H.323 entity has at least one network address that uniquely identifies the H.323 entity on the network. For each network address, each H.323 entity may have several TSAP identifiers that enable the multiplexing of several channels sharing the same network address. Endpoints have one well-known TSAP identifier known as the Call Signaling Channel TSAP Identifier. In addition, Gatekeepers also have one well-known TSAP identifier defined known as the RAS Channel TSAP Identifier, and one well-known multicast address defined known as the Discovery Multicast Address. Endpoints and H.323 entities use dynamic TSAP Identifiers for the H.245 Control Channel, Audio Channels, Video Channels, and Data Channels while the Gatekeeper uses a dynamic TSAP Identifier for Call Signaling Channels.

Further, an endpoint may have one or more alias addresses associated with it. An alias address represents the endpoint and provides an alternate method of addressing the endpoint. It is important to note that an endpoint may have more than one alias address that translates to the same TSAP. The alias may comprise, for example, private telephone numbers, E.164 numbers, any alphanumeric string that may represent a name, e-mail address, etc. In addition, the alias may comprise a MAC address, IP address, ATM address, access token, DNS address, TSAP as IP address concatenated with port number or name alias. Note that alias addresses are unique within a zone and that gatekeepers do not have alias addresses.

When there is a Gatekeeper in the network, the calling endpoint addresses the called endpoint by its Call Signaling Channel Transport Address or by its alias address. The Gatekeeper translates the latter into a Call Signaling Channel Transport Address.

An endpoint joins a zone via the registration process whereby it informs the Gatekeeper of its Transport Addresses and one or more associated alias addresses. Note that registration must take place before any calls are attempted. When endpoints are powered up, they look on the network for the Gatekeeper and once found, they register their TSAP and one or more aliases with therewith.

Prior Art Four Channel Audio Recording

In LAN Telephony applications, the voice samples generated are packed within RTP packets that are then encapsulated within UDP/IP packets. The UDP packets that travel over an IP network may, however, be delayed, dropped or arrive out of order from their original transmission sequence depending on the degree of network congestion. Therefore, the frequency in which the packets arrive to the receive side is not constant.

In order to combat the delay problems, many devices implement a jitter buffer on the receive side. If packets are only delayed on the network, arriving at the receiver before the jitter buffer underflows, the receive side will hear the sound as it was originally transmitted by the local endpoint. If, however, packets are dropped or packets are delayed too much and the jitter buffer underflows (i.e. becomes empty), the receiving device either (1) replays the last packet received or (2) it injects a silence. Thus, in the event packets are dropped or are delayed excessively causing jitter buffer underflow, the sound that is played on the receive side is not the original sound that was transmitted.

Many audio applications including voice require that the audio (or voice) be recorded, at one or both ends of a conversation. A block diagram illustrating a prior art packet-based four channel audio recorder is shown in FIG. 4. The system, generally referenced 80, comprises a packet network 88 to which are connected a plurality of endpoints 82, such as endpoints A and B. Each endpoint comprises a loudspeaker (not shown) for generating audio and a microphone for converting audio, i.e. voice, to an electrical signal. Each endpoint is operative to receive an Rx signal 90 from the other endpoint and to generate a Tx signal 92 to the other side.

The system further comprises a 4 four channel IP recorder device 94 that is adapted to receive a plurality of digitized audio channels and record them on storage media such as a hard disk, flash memory disk, RAM, NVRAM, magnetic tape, etc. Each endpoint sends two separate channels of audio to the recording device: a (1) played audio channel and a (2) transmitted audio channel. Endpoint A is adapted to send a separate played audio signal $P_A(n)$ 96 and a transmitted audio signal $T_A(n)$ 98 to the recording device. Note that the signal received (Rx 90) is not forwarded to the recorder as this signal is not necessarily the signal that is played by the endpoint. Similarly, endpoint B is adapted to send a separate played audio signal $P_B(n)$ 100 and a transmitted audio signal $T_B(n)$ 102 to the recording device.

A requirement of any accurate recording system is to be able to faithfully playback the sound that was originally recorded. In a packet telephony system, a recorder must be able to playback the sound that was generated on the side of the talking endpoint (i.e. sent by the transmitter) in addition to the sound that was played at the listening endpoint (i.e. the playback signal sent to the loudspeaker). Therefore, each endpoint must forward two separate audio streams: the audio that is played through the speaker and the audio that is transmitted to the other side.

In addition, the recording device must synchronize. The four channels of audio it receives from the two endpoints. It must be adapted to not only synchronize between playback and transmit between two endpoints, but must also be adapted to synchronize audio between transmit and playback from the same endpoint.

SUMMARY OF THE INVENTION

The present invention provides an apparatus for and a method of audio recording in packet-based telephony systems. Using the present invention, the equivalent of four audio channels are recorded utilizing only two recording channels. Each channel recorded comprises the stream of packets (e.g., RTP packets) generated and transmitted by each endpoint to the other side. The RTP packets include the samples generated by the particular endpoint in addition to an indication (e.g., a pointer) of the samples received from the other side actually played by the endpoint. Note that the audio played on an endpoint is not necessarily the samples received from the other side.

The transmit data, including the indication of the samples played, generated by each side of a connection is sent to the recording device. The recording device is operative to store the received packet stream on some type of storage media such as hard disk drive, a flash memory disk, RAM, NVRAM, magnetic tape, etc. The recording device comprises means for synchronizing the audio stream of one endpoint to the audio stream from the other endpoint. The recording device must know what was played at the endpoint in order to accurately playback the audio samples generated by and received from the other endpoint. Thus, the recording device is effectively provided knowledge of the actual audio played on both ends of the connection.

In one embodiment, a two channel IP recording device is adapted to receive a single packet stream generated by each side of a connection. The packet stream is transported from each endpoint to the recording device over a reliable connection, using either a reliable protocol such as TCP/IP, a point-to-point connection, or a circuit based connection. Note that it is not necessary that the reliable connection be a real time connection. The packet stream includes the digital audio data generated on the endpoint, e.g., voice from a microphone, and an indication, e.g., pointer, of the packet from the other side that was played on the endpoint. In a second embodiment, each endpoint comprises recording means for recording the transmit packet stream sent to the other side. A subsequent offline process combines and synchronizes the two recorded packet streams using the indications that were added to the RTP packets.

Since the recorder receives the audio signal that was generated and transmitted from each endpoint, it can reconstruct the audio signal that was actually played on the endpoint. To playback an audio signal, the recording device needs to know the samples that were actually played on each endpoint. The recorder is provided knowledge of the audio played on the other end via information transmitted in the data sample packets it receives. Each endpoint is adapted to include an indication of the audio that it played, with the packet of data samples sent to the recorder.

To perform accurate playback, the recording device needs to know for each sample an endpoint recorded, what sample the endpoint played at that time. The recording device is provided knowledge of the audio played on the endpoint via information transmitted in the header and header extension portions of the RTP packets and via the knowledge of the number of samples in the payload portion of the RTP packet. There are two methods by which an endpoint informs the recording device which samples were played when the samples in the data packet were recorded: the first method uses timestamps and the second method uses the RTP packet sequence numbers and offset pointers into the RTP packets.

In the timestamp method, each endpoint is adapted to include the timestamp of the packet of audio that is played, with the packet of data samples sent to the recording device. Thus, two timestamps are sent in the RTP packet including (1) a first timestamp of the data samples generated by the endpoint (this timestamp value is taken when the first sample in the packet is taken) and (2) a second timestamp of the packet received from the other endpoint and played at a point in time when the first sample of the local endpoint packet is generated.

Each endpoint is operative to track the timestamp of the data samples received encapsulated in RTP packets sent from the other endpoint. These data samples are subsequently played by the endpoint through its associated speaker. The data samples generated by the endpoint are timestamped and placed in RTP packets. In addition, the timestamp of the data samples played by the other endpoint at that moment in time is also placed in the extension portion of the header of the RTP packet sent to the recording device.

If the last packet received was replayed, an indication is placed in the header extension of the packet that comprises the timestamp of the most recently received RTP packet. If a silence is played, a zero is placed in the header extension. The completed RTP packet is then sent over a real time connection (e.g., UDP/IP) to the remote endpoint for playing, and a copy is sent to the recording device over a reliable connection.

The recording device can replay the signal transmitted from each endpoint and the signal that was played at each endpoint. In order to replay the transmitted signal of each endpoint the recording device tracks the RTP packets according to the order of their sequence number and plays the samples in each RTP packet. In order to replay the signal played at an endpoint, the recording device passes over the RTP packets received from that endpoint according to their order. The timestamp from the header extension portion of the RTP packets received from the endpoint is extracted. A timestamp equal to zero indicates that a silence was played at the endpoint. If the timestamp extracted is equal to the previous timestamp sent by the endpoint, then this indicates that the endpoint replayed the last received packet.

Otherwise, the timestamp extracted from the header extension is the timestamp of the packet that was played on the endpoint at a point in time corresponding to the timestamp of the data samples sent in the packet. The recording device plays back the audio using its knowledge of the data samples played on the endpoint. Since the recording device stores a copy of the packets transmitted to the other end, only the timestamp need be sent from an endpoint to uniquely identify a particular packet.

The sequence method is similar to the timestamp method with the difference being that endpoint A places the sequence number and the offset within the packet that was received from endpoint B and played at the time when the first sample of the RTP packet being built is taken. This is in place of sending a timestamp.

There is therefore provided in accordance with the present invention a method of recording in a packet telephony system, the system including a first endpoint, second endpoint and a recording device, the method comprising the steps of generating data samples on the first endpoint corresponding to a first audio signal and generating data samples on the second endpoint corresponding to a second audio signal, tracking a second timestamp of data samples originating from the second endpoint that are played by the first endpoint and tracking a first timestamp of data samples originating from the first endpoint that are played by the second endpoint, sending a first stream of packets from the first endpoint to the recording device, the first stream of packets containing data samples generated by the first endpoint, a first timestamp corresponding thereto and the second timestamp of data samples from the second endpoint played by the first endpoint at that moment in time, sending a second stream of packets from the second endpoint to the recording device, the second stream of packets containing data samples generated by the second endpoint, a second timestamp corresponding thereto and the first timestamp of data samples from the first endpoint played by the second endpoint at that moment in time, placing a first indication in the first stream of packets sent to the recording device, the first indication operative to specify whether a packet, several packets, several sequential samples from the same packet or several sequential samples from different packets received by the first endpoint were replayed or that a silence was played, placing a second indication in the second stream of packets sent to the recording device, the second indication operative to specify whether a packet, several packets, several sequential samples from the same packet or several sequential samples from different packets received by the second endpoint were replayed or that a silence was played and recording the first stream of packets and the second stream of packets representing the signals generated and played on the first endpoint and the second endpoint, respectively.

There is also provided in accordance with the present invention a method of recording in a packet telephony system, the system including a first endpoint, second endpoint and a recording device, the method comprising the steps of generating data samples on the first endpoint corresponding to a first audio signal and generating data samples on the second endpoint corresponding to a second audio signal, tracking a second timestamp of data samples originating from the second endpoint that are played by the first endpoint and tracking a first timestamp of data samples originating from the first endpoint that are played by the second endpoint, recording a first stream of packets at the first endpoint, the first stream of packets containing data samples generated by the first endpoint, a first timestamp corresponding thereto and the second timestamp of data samples from the second endpoint played by the first endpoint at that moment in time, recording a second stream of packets at the second endpoint, the second stream of packets containing data samples generated by the second endpoint, a second timestamp corresponding thereto and the first timestamp of data samples from the first endpoint played by the second endpoint at that moment in time, placing a first indication in the first stream of packets operative to specify whether a packet, several packets, several sequential samples from the same packet or several sequential samples from different packets received by the first endpoint were replayed or that a silence was played and placing a second indication in the second stream of packets operative to specify whether a packet, several packets, several sequential samples from the same packet or several sequential samples from different packets received by the second endpoint were replayed or that a silence was played.

BRIEF DESCRIPTION OF THE DRAWINGS

The invention is herein described, by way of example only, with reference to the accompanying drawings, wherein:

FIGS. 8A, 8B and 8C are a flow diagram illustrating the recording method of the present invention performed on an endpoint;

DETAILED DESCRIPTION OF THE INVENTION

Figure 1:
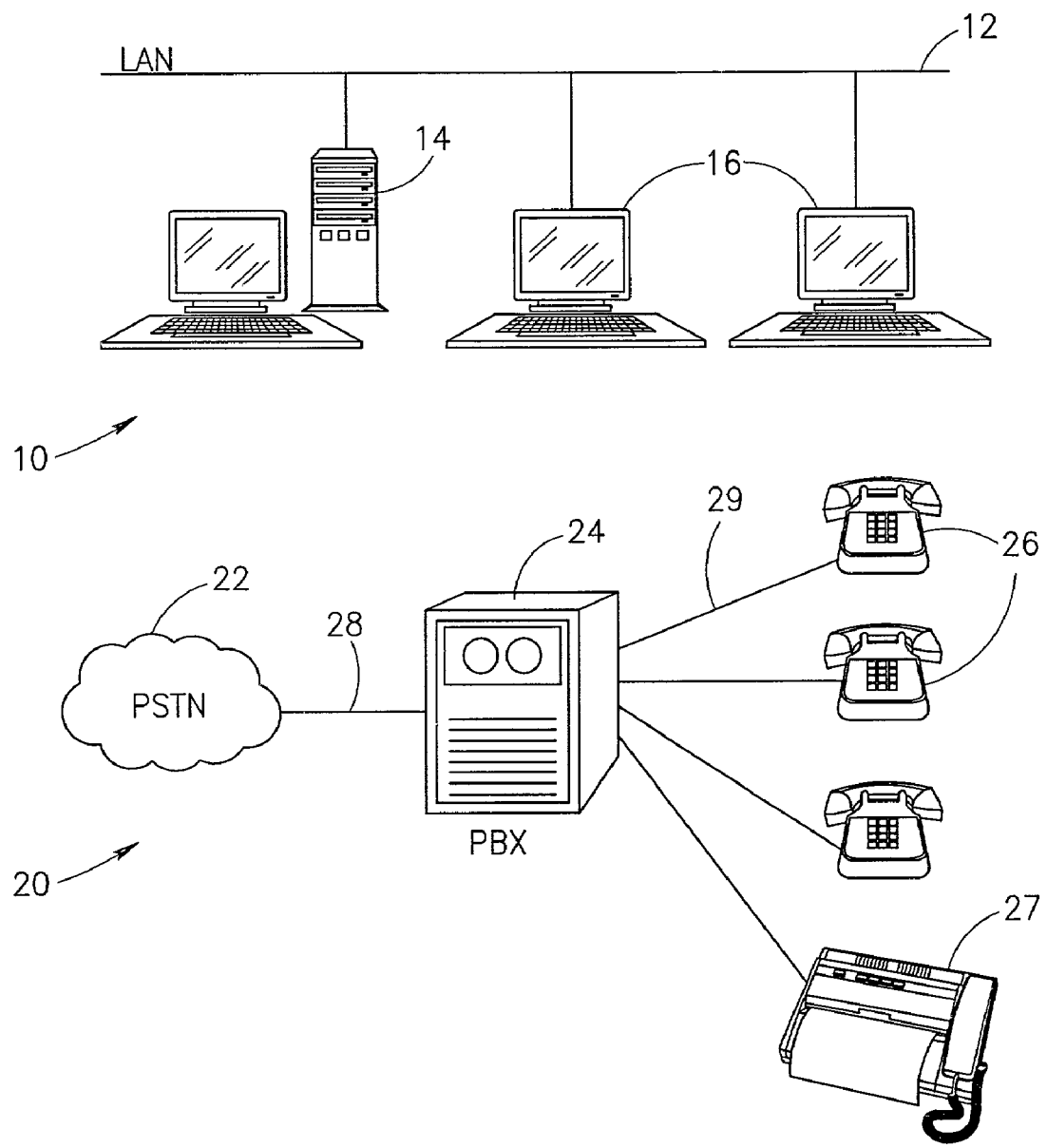
FIG. 1 is a block diagram illustrating example separate prior art data and voice networks.
Figure 2:
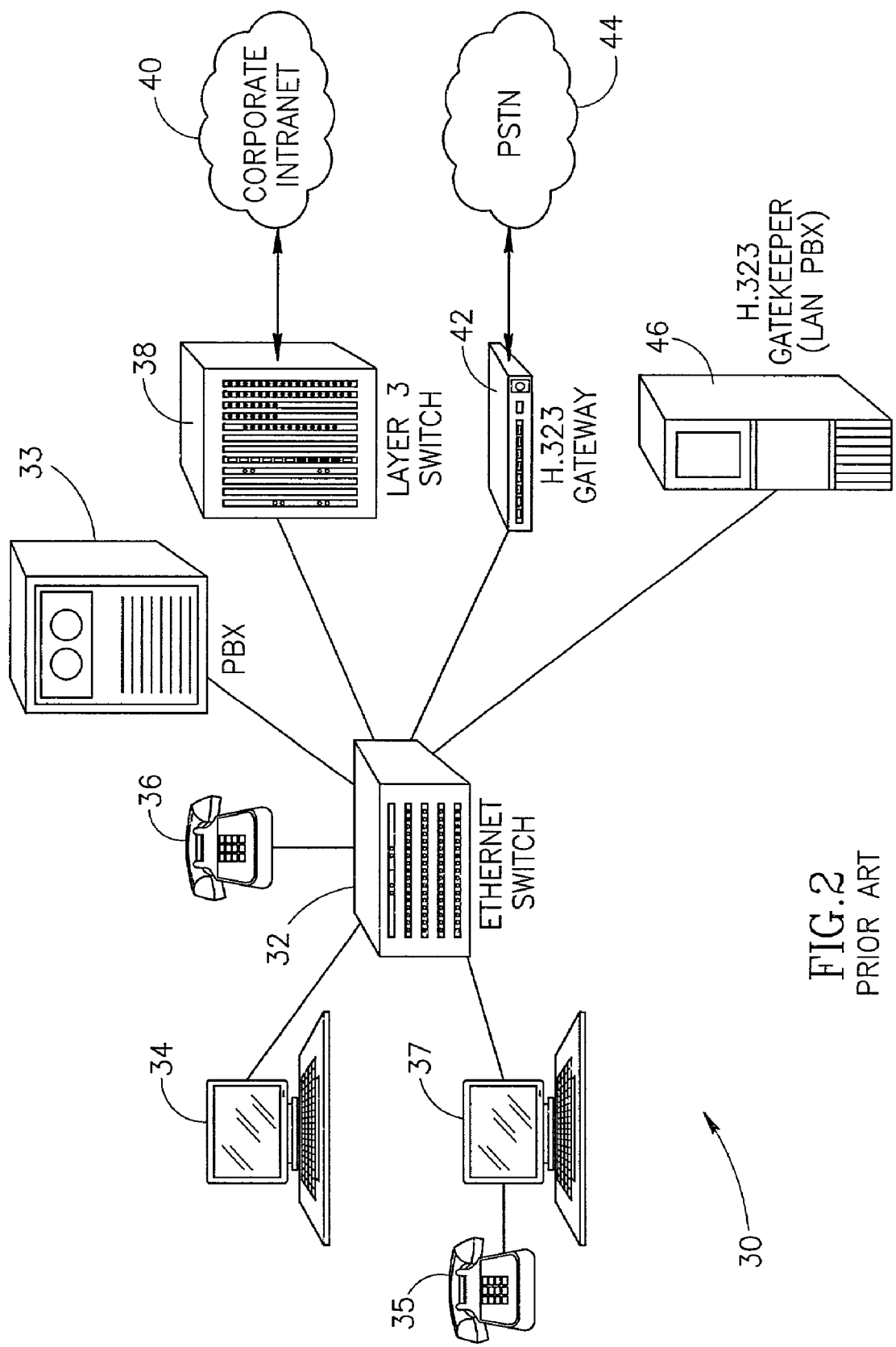
FIG. 2 is a block diagram illustrating a voice over packet network where voice and data share a common infrastructure.
Figure 3:
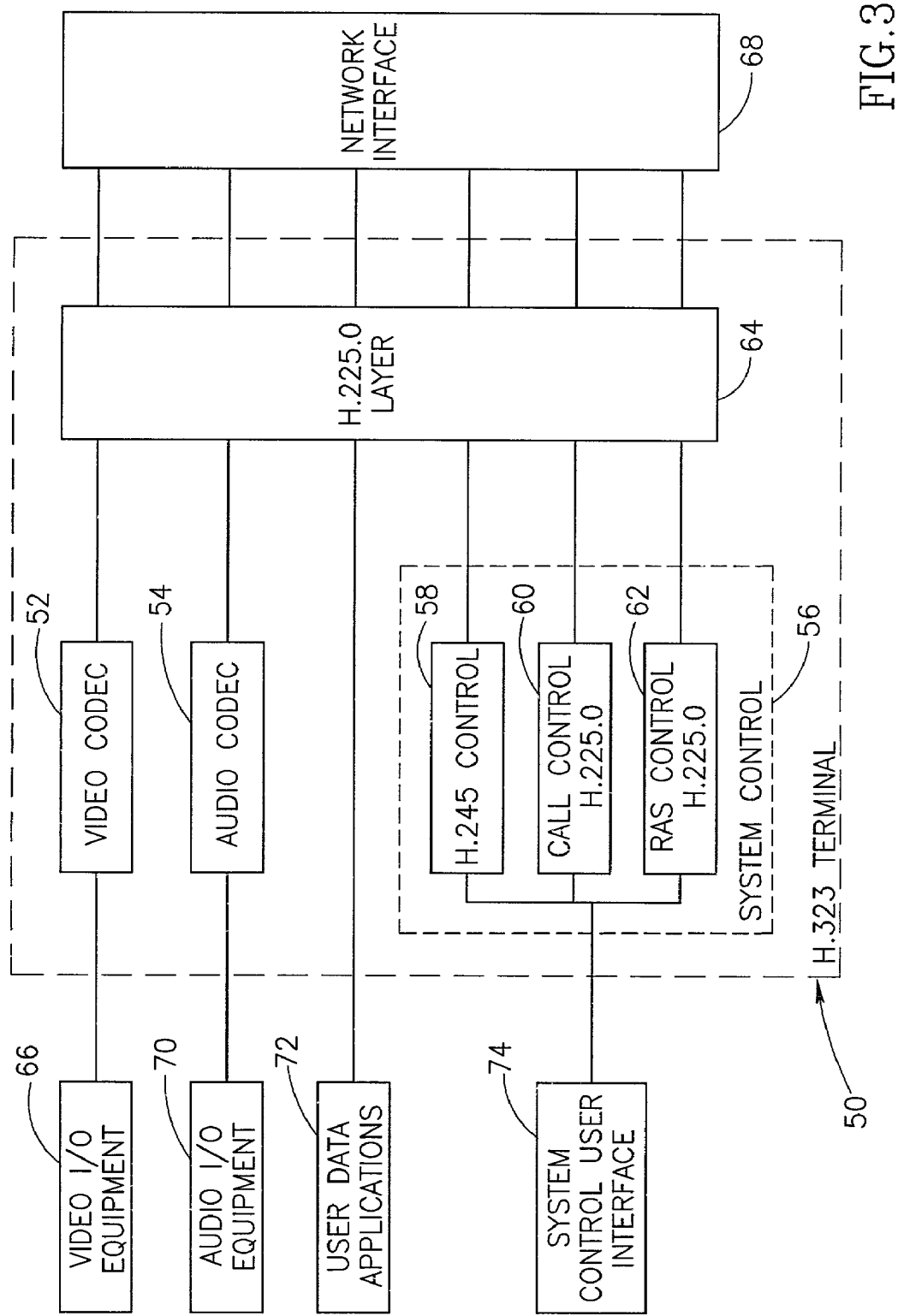
FIG. 3 is a block diagram illustrating an example prior art H.323 compliant terminal equipment wherein each side transmits both transmit and receive audio channel data.
Figure 4:
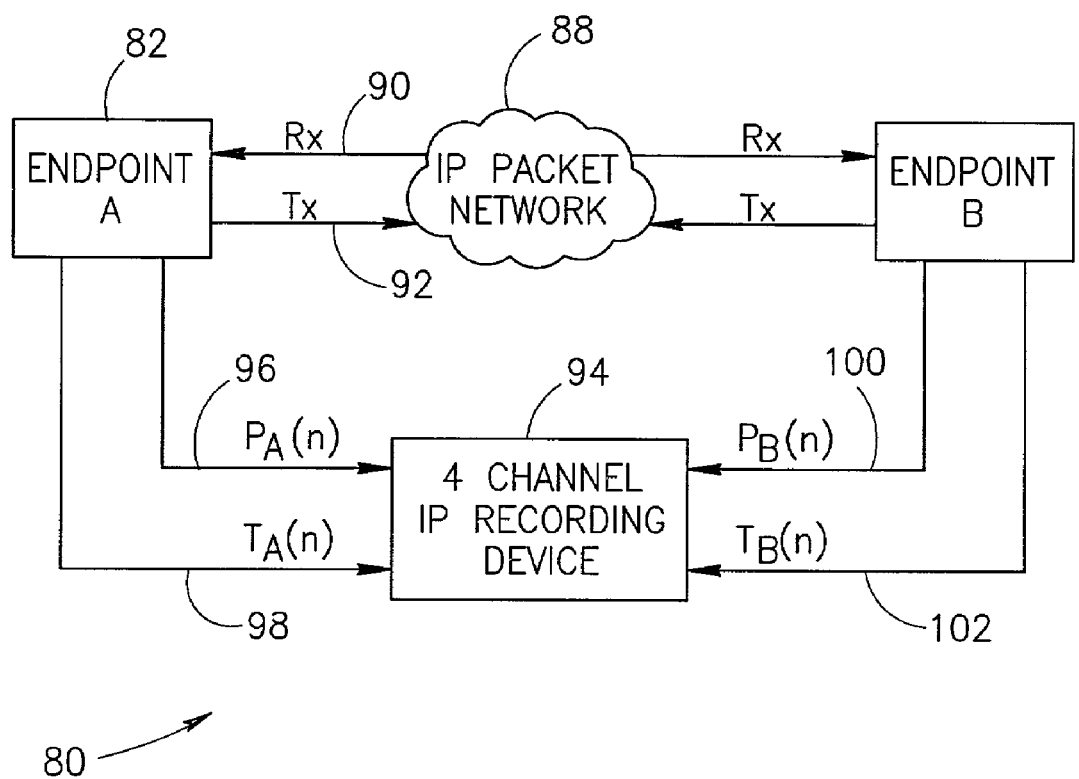
FIG. 4 is a block diagram illustrating a prior art packet-based four-channel audio recorder.

Notation Used Throughout
The following notation is used throughout this document.

| Term | Definition |
| --- | --- |
| ACD | Automatic Call Distribution |
| ATM | Asynchronous Transfer Mode |
| CO | Central Office |
| DNS | Domain Name Server |
| DSP | Digital Signal Processing |
| IETF | Internet Engineering Task Force |
| IP | Internet Protocol |
| ISDN | Integrated Services Digital Network |
| ITU | International Telecommunications Union |
| LAN | Local Area Network |
| MAC | Media Access Control |
| MCU | Multipoint Control Network |
| NVRAM | Non Volatile Random Access Memory |
| OC | Optical Carrier |
| PBX | Private Branch Exchange |
| PC | Personal Computer |
| PSTN | Public Switched Telephone Network |
| QoS | Quality of Service |
| RAM | Random Access Memory |
| RAS | Registration, Admission and Status |
| RFC | Request for Comment |
| RSVP | Resource Reservation Protocol |
| RTCP | Real-Time Transport Control Protocol |
| RTP | Real-Time Transport Protocol |
| SCN | Switched Circuit Network |
| SIP | Session Initiation Protocol |
| TCP | Transmission Control Protocol |
| TSAP | Transport layer Access Service Point |
| UDP | User Datagram Protocol |
| USB | Universal Serial Bus |
| WAN | Wide Area Network |

Definitions Used Throughout

The following definitions are used throughout this document.

| Term | Definition |
| --- | --- |
| Call | Point to point multimedia connection between two H.323 endpoints. The call begins with the call setup procedure and ends with the call termination procedure. |
| Call signaling channel | Reliable channel used to convey the call setup and teardown messages between two H.323 entities |
| Channel | A channel is a uni-directional link between two endpoints. |
| End System | An application that generates the content to be sent in RTP packets and/or consumes the content of received RTP packets. |
| Endpoint | An H.323 terminal, gateway or MCU. An endpoint can call and be called, it generates and/or terminates information streams. |

-continued

The following definitions are used throughout this document.

| Term | Definition |
| --- | --- |
| Gatekeeper | An H.323 entity on the network that provides address translation and controls access to the network for H.323 terminals, gateways and MCUs. |
| Gateway | An endpoint on the network that provides for real-time, two-way communications between H.323 terminals on the packet based network and other ITU terminals (e.g., ISDN, ATM, etc.) on a switched circuit network. |
| H.323 entity | Any H.323 component including terminals, gateways, gatekeepers, MPs, MCs and MCUs. |
| Port | The abstraction that transport protocols use to distinguish among multiple destinations within a given host computer. RTP depends upon the lower layer protocols to provide some mechanism such as ports to multiplex the RTP and RTCP packets of a session. |
| RTCP Packet | A control packet consisting of a fixed header similar to that of RTP data packets, followed by structured elements that vary depending upon the RTCP packet type. Typically, multiple RTCP packets are sent together as a compound RTCP packet in a single packet of the underlying protocol using the length field in the fixed header of each RTCP packet. |
| RTP Packet | A data packet consisting of the fixed RTP header, a possibly empty list of contributing sources and the payload data. |
| RTP Payload | The data transported by RTP in a packet, for example audio samples or compressed video data. |
| RTP Session | For each participant, the session is defined by a pair of destination Transport Addresses (one Network Address plus a TSAP identifier pair for RTP and RTCP). The destination Transport Address may be common for all participants or may be different for each. In a multimedia session, the media audio and video are carried in separate RTP sessions with their own RTCP packets. The multiple RTP sessions are distinguished by different Transport Addresses. |
| Switched Circuit Network | A public or private switched telecommunication network such as the PSTN, ISDN, etc. |
| Terminal | An H.323 terminal is an endpoint on the network which provides for real-time, two-way communications with another H.323 terminal, gateway or MCU. |
| Transport Address | The transport layer address of an addressable H.323 entity as defined by the network protocol suite in use. The Transport Address of an H.323 entity is composed of the Network Address plus the TSAP identifier of the addressable H.323 entity. |
| TSAP Identifier | The piece of information used to multiplex several transport connections of the same type on a single H.323 entity with all transport connections sharing the same Network Address (e.g., the port number in a TCP/UDP/IP environment). TSAP identifiers may be assigned statically by an external authority or assigned dynamically during the setup of a call. |
| Zone | The collection of all terminals, gateways and MCUs managed by a single gatekeeper. A zone includes at least one terminal and may or may not include gateways or MCUs. A zone has one and only one gatekeeper. |

DESCRIPTION OF THE INVENTION

For illustration purposes, the apparatus and method of the present invention are presented in the context of a LAN telephony network operating under the ITU-T H.323 suite of protocols. The H.323 group of protocols is used to transfer multimedia information, e.g., voice, facsimile, video, data, etc., over IP networks. Note, however, that it is intended that the scope of the present invention not be limited to the examples and applications presented herein, as the invention may be applied to numerous other environments, protocols and networks as well. In particular, the apparatus and method of the present invention may be applied in systems running the Session Initiation Protocol (SIP) proposed by the Internet Engineering Task Force (IETF).

Figure 5:
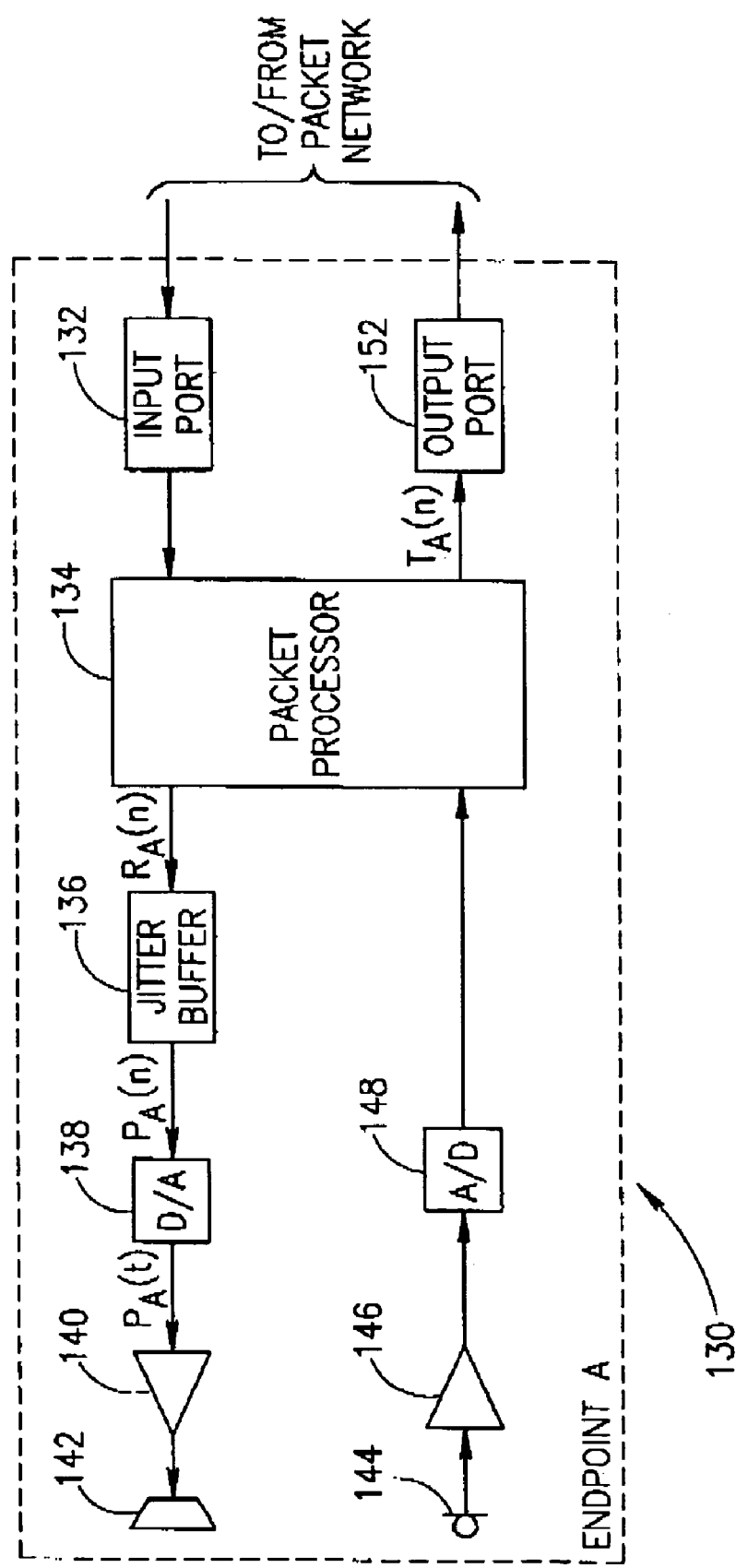
FIG. 5 is a block diagram illustrating the structure of an endpoint in the packet network in more detail.

A block diagram illustrating the structure of an endpoint in the packet network in more detail is shown in FIG. 5. For clarity sake, endpoint A only is shown in more detail with the structure of endpoint B being identical. Each endpoint, generally referenced 130, comprises an input port 132, output port 152, packet processor 134, jitter buffer 136, D/A converter 138, amplifier and analog interface circuitry 140, microphone 144, analog amplifier circuit 146 and A/D converter 148.

The typical sampling rate for voice is 8 kHz at 8 bits/sample yielding a bit rate of 64 kbps. Thus, every 125 microseconds, a sample is taken from the microphone and a received sample is played.

The jitter buffer 136 functions to compensate for the random arrival times of packets over the packet network. In most networks, packets arrive at the jitter buffer in an indeterministic manner due to the delay of the network. This is notwithstanding the fact that the packets are placed onto the network in a synchronous manner. The indeterministic nature of the network will not be noticed as long as the jitter buffer does not underflow or overflow. The jitter buffer is typically designed to hold approximately 100 ms of audio. A longer jitter buffer may cause a noticeable voice delay to users.

As long as packets arrive quickly enough such that the jitter buffer does not underflow, the user will hear continuous sound. If the jitter buffer underflows, what the receiver does is dependent on the policy established. For example, the endpoint can replay the last packet received or individual samples therefrom or may insert a silence. If the underflow persists, a silence is played.

Figure 6:
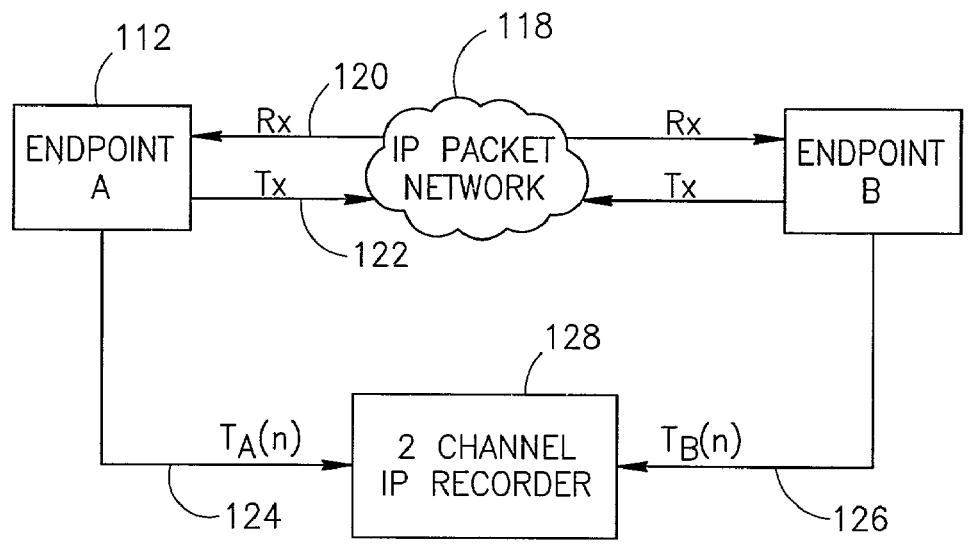
FIG. 6 is a block diagram illustrating a first embodiment centralized four-channel audio recorder constructed in accordance with the present invention.

A block diagram illustrating a first embodiment centralized four channel audio recorder constructed in accordance with the present invention is shown in FIG. 6. The system, generally referenced 110, comprises two endpoints 112, labeled endpoint A and endpoint B. Both endpoints are adapted to transmit and receive voice data over a packet network 118. Endpoint A comprises a receive circuit (not shown) adapted to receive a signal Rx signal 120 and a D/A converter coupled to a speaker. A microphone captures the analog voice that is digitized by an A/D converter. A transmit circuit places the sampled voice data in the payload portion of an RTP packet and transmits the packets as Tx signal 122. Similarly, endpoint B comprises a microphone, A/D converter, transmit circuit, receive circuit, D/A converter and speaker similar to that of endpoint A.

Effective Four Channel Recording Using Two Channels

In accordance with the present invention, the recording device is adapted to record and playback the signals generated and played at each endpoint of a connection in the packet telephony system. Thus, considering a voice application, the recording device is able to playback the voice that was spoken and played at each endpoint.

As described above, in a prior art recording device this requires four audio channels, including the audio played and generated at both endpoint, to be transmitted to the recording device. Using the recording system of the present invention, the four audio channels can be effectively recorded using only two channel including one channel transmitted from each endpoint.

As described above, in a prior art recording device this requires four audio channels, including the audio played and generated at both endpoint, to be transmitted to the recording device. Using the recording system of the present invention, the four audio channels can be effectively recorded using only two channels including one channel transmitted from each endpoint.

The media may comprise, for example, hard disk drive, RAM, NVRAM, magnetic tape, a flash memory disk, etc. In the example presented herein, the recording device comprises a two channel recording device that is adapted to effectively playback four audio channels. Endpoint A is adapted to transmit a single packet stream 124 denoted by $T_A(n)$ to the recording device 128 while endpoint B is adapted to transmit a single packet stream 126 denoted by $T_B(n)$ to the recording device.

For clarity sake, the method is described from the perspective of the processing performed by endpoint A. Note, however, that similar processing is performed by endpoint B as well. In accordance with the present invention, endpoint A is adapted to add to the RTP packet header sent to the recording device, an indication of the voice sample from endpoint B that was played by endpoint A. The indication is placed in the extension portion of the RTP packet header. In addition, endpoint A timestamps its RTP headers with its own timestamp clock to permit endpoint B to perform similar processing and to permit the recording device to process the packets. The indication may comprise any suitable means such as the timestamp of the packet played or a combination of the sequence number and offset within the packet. Note that in this example embodiment, the same RTP packet is sent to the recording device and to the other endpoint. Only the recording device, however, requires the indications posted in the header extension portion, as the other endpoint does not require them.

If endpoint A is forced to replay the last packet due to jitter buffer underflow, it places the timestamp of the last packet (i.e. the packet that was replayed) received from endpoint B in the header extension part of the RTP packet it sends to the recording device. If endpoint A is forced to play a silence, it places a zero in the header extension part of the RTP packet it sends to the recording device.

Every RTP packet that endpoint A sends to endpoint B it also sends to the recording device using a reliable protocol such as TCP/IP. Similarly, every RTP packet that endpoint B sends to endpoint A is also sent to the recording device using a reliable protocol such as TCP/IP. The recording device is operative to store and record the information contained in the RTP packet including the timestamp and indication (i.e. additional timestamp or sequence number/offset).

When the recording device is requested to replay the audio generated by endpoint A, it plays the content of the RTP packets endpoint A sent to endpoint B. In order to replay the audio played by endpoint A, it uses the indication information conveyed in the RTP packet. For example, using the timestamp indication method, the timestamp of the endpoint B clock that endpoint A added to the RTP packet. The timestamp serves as a pointer to the RTP packets sent by endpoint B and stored by the recording device.

If the timestamp equals zero, it indicates to the recording device that a silence was played by the endpoint. If a codec for voice compression was used by endpoint A, the recording device is operative to decompress the samples before playing them back.

In a second embodiment, a single centralized recording device is not used. Each endpoint comprises means for storing the call details and recording the content of the RTP packet stream (including the header and header extension of the RTP packets) sent to the other side of the connection rather than sending the packets over a TCP/IP connection to a recording device. The recording device may be connected to the endpoint device by any suitable means such as RS-232, USB, IEEE 1394, other parallel or serial means, wireless means, optical means, etc. or can be a part of the endpoint itself (e.g., a flash integrated circuit or memory module on the endpoint board).

In this embodiment, endpoints A and B comprise suitable storage means such as hard disk, RAM, NVRAM, Flash memory, magnetic tape, etc. Each transmit RTP packet stream is thus recorded locally by each endpoint. At some point in time later in a process performed offline, the two packet streams are collected, sorted and combined into a single synchronous packet stream. The sorting process is adapted to match the call records of one endpoint with the call records of the other endpoint.

The data forwarding and recording method of the present invention will now be described in more detail. For reference purposes, the following signals are defined. Note that signals having an index 'n' are signals in the discrete time plane, i.e. digital signals. A signal comprises a vector of samples. Signals having an index 't' are signals in the continuous time plane, i.e., analog signals.

$T_A(n)$: the signal generated by the transmit circuit on endpoint A.

$T_B(n)$: the signal generated by the transmit circuit on endpoint B.

$R_A(n)$: the signal input to the receive circuit on endpoint A.

$R_B(n)$: the signal input to the receive circuit on endpoint B.

$P_A(n)$: the signal to be played before being fed to the D/A converter on endpoint A.

$P_B(n)$: the signal to be played before being fed to the D/A converter on endpoint B.

$P_A(t)$: the signal played (i.e. output) through the speaker on endpoint A.

$P_B(t)$: the signal played through the speaker on endpoint B.

As described above, in the event packets are delayed or lost due to network congestion, and the jitter buffer underflows, the receive circuit is adapted to either replay the last received packet or to insert silence. Thus, the signal received $R_A(n)$ is not the same as the signal played $P_A(n)$.

Figure 7:
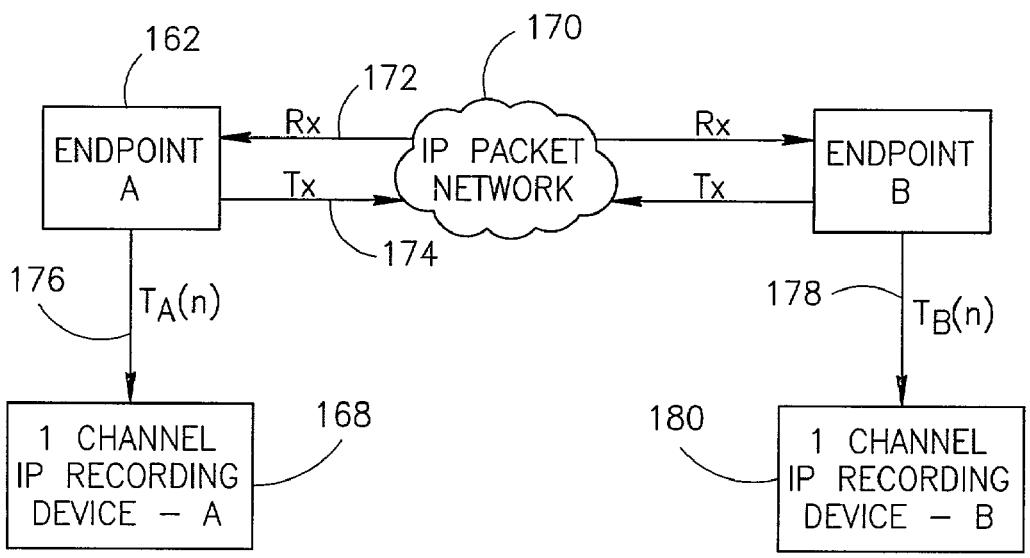
FIG. 7 is a block diagram illustrating a second embodiment distributed four-channel audio recorder constructed in accordance with the present invention that is operative to regenerate four audio channels.
Figure 8A:
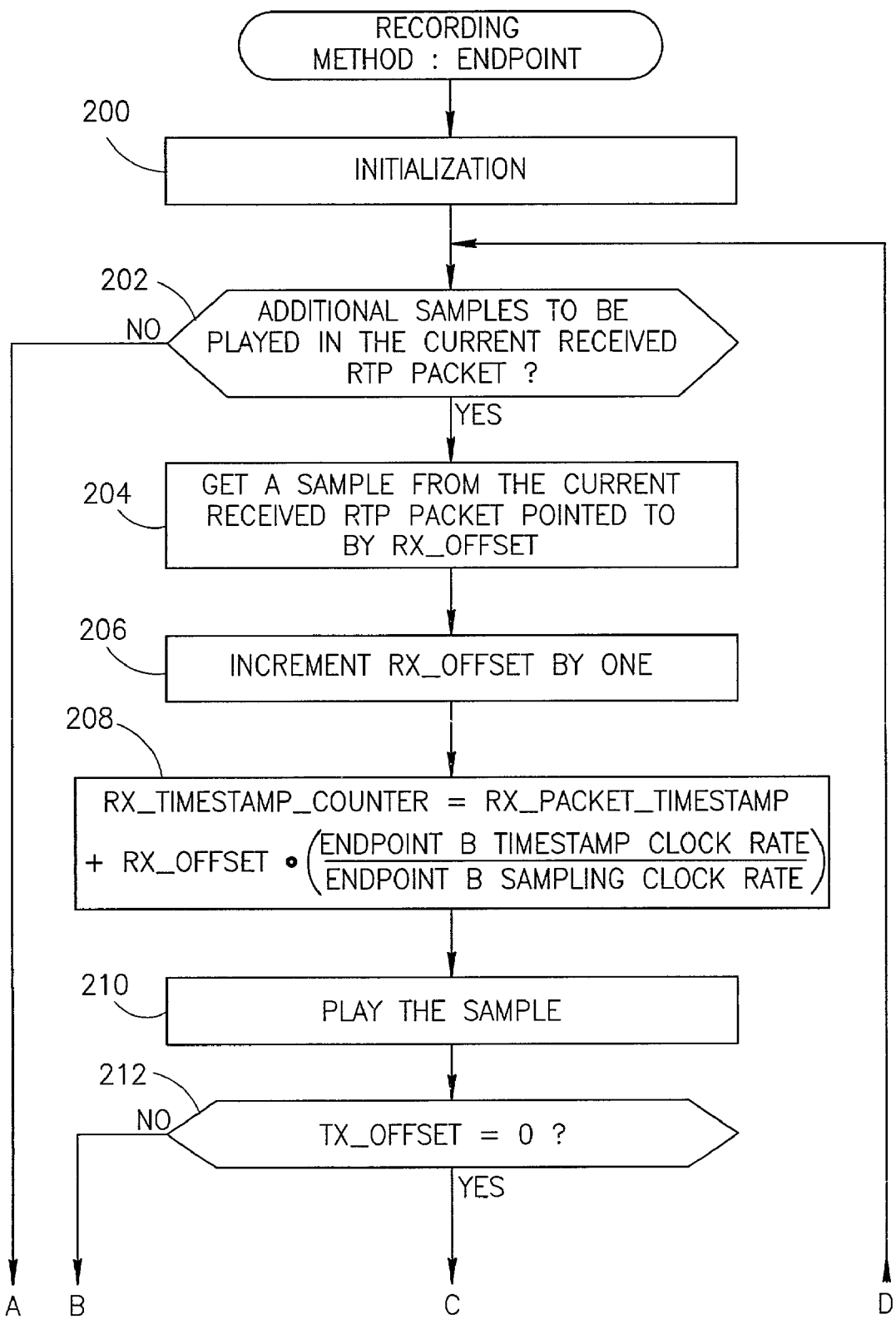
Figure 8C:
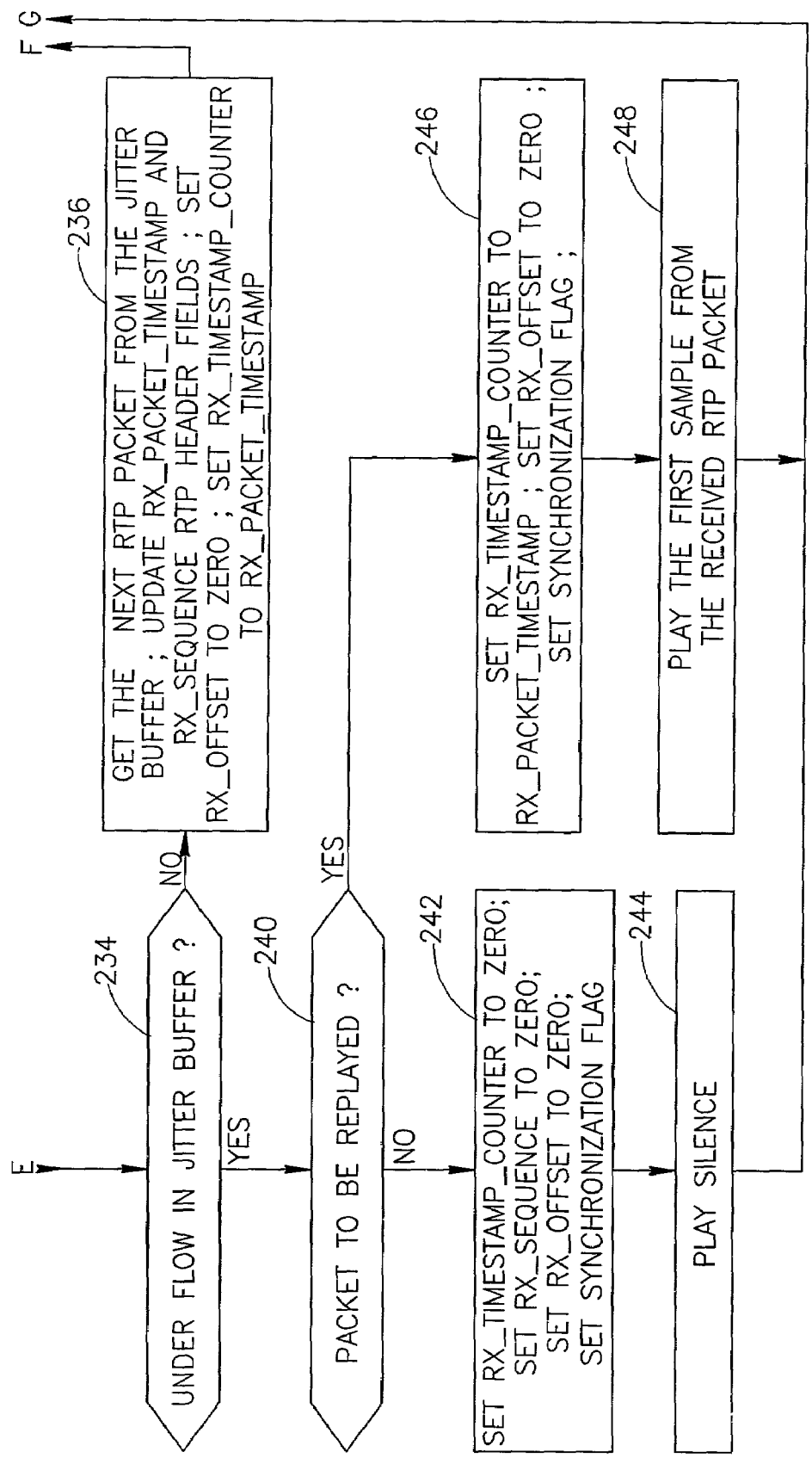

A flow diagram illustrating the recording method of the present invention performed on an endpoint is shown in FIGS. 8A, 8B and 8C. The method is described in the context of the example IP telephony system of FIG. 6 or 7. For clarity sake, the method is described from the perspective of endpoint A. Note, however, that a similar method is performed by endpoint B as well. Note also that the recording method of the present invention is not restricted to the examples presented herein as one skilled in the art can apply the principles of the present invention to other systems and networks as well.

After the connection between the two endpoints is set up, endpoint A initializes all its internal circuitry used for transmit and receive operations (step 200). In particular, the transmit and receive channel variables are initialized. The hardware counters rx_offset pointer relating to the received packet that is played and the tx_offset pointer relating to the packet generated from samples are reset to zero. The synchronization flag is reset to zero and the rx_packet_timestamp and rx_sequence variables are loaded from the header of the first received RTP packet.

The transmit circuitry of endpoint A begins operating and the receive circuitry plays silence until the first RTP packet from endpoint B is received. When the first RTP packet is received, its sequence number is extracted from its header and saved in the rx_sequence variable and endpoint B timestamp is extracted from the RTP packet header and saved in the variable rx_packet_timestamp.

If there are unplayed samples in the current received RTP packet (step 202) then the sample pointed to by rx_offset is extracted from the RTP packet payload (step 204) and rx_offset is incremented to point to the next sample (step 206). The endpoint B timestamp associated with the extracted sample is calculated (step 208) using the following linear extrapolation $$\text{rx\_timestamp\_counter} = \text{rx\_packet\_timestamp} + \text{rx\_offset} \times \left( \frac{\text{endpoint } B \text{ timestamp clock rate}}{\text{endpoint } B \text{ sampling clock rate}} \right) \quad (1)$$

where the rx_timestamp_counter is the value that is written to the header extension. If the timestamp and sampling clock rates are the same, than the fraction reduces to one. If, however, they are different the rx_offset is adjusted accordingly. The sample is then input to the A/D converter in endpoint A and played through the corresponding loudspeaker (step 210).

If the tx_offset pointer points to the beginning of the RTP packet endpoint A is currently building for transmission to endpoint B (i.e. tx_offset=0) (step 212), then the packet is a new RTP packet and the packet processor must build the RTP packet header (step 214). The timestamp counter of endpoint A is updated and placed in the RTP header. In addition, tx_sequence number of endpoint A is placed in the RTP packet header (step 214). If the timestamp method is used then the rx_timestamp_counter is placed in the RTP header extension (step 216). If the sequence method is used then rx_sequence and rx_offset are placed in the RTP header extension (step 216).

A sample is recorded using the microphone and the A/D converter (step 218) and the sample is appended to the RTP packet payload at a position pointed to by tx_offset (step 220). The tx_offset is then incremented by one (step 222).

It is then checked whether the RTP packet being built is full (step 224). If it is not full, then it is checked whether there are additional samples to be played (step 202). If the RTP packet is full (step 224), then the packet processor sends the packet including the packet header to the other endpoint on a real time connection (step 226). A copy of the RTP packet including the packet header and header extension is sent to the recording device on a reliable connection (step 227). An empty buffer is then allocated for the next RTP packet to be built (step 228). In addition, the tx_offset is set to zero and tx_sequence is incremented by one. If the synchronization flag is not set (step 230), the method continues with step 202. Otherwise, the synchronization flag is reset (step 232) and the method continues with step 214.

If there are no additional unplayed samples in the current received RTP packet (step 202), then the packet processor checks if a packet is pending in the jitter buffer (step 234). If a packet is found in the jitter buffer, the packet processor retrieves it and extracts the endpoint B timestamp and stores it in rx_packet_timestamp. In addition, the sequence number is extracted from the RTP packet header and saved in rx_sequence. The rx_offset is reset to zero, rx_timestamp_counter is set to rx_packet_timestamp and control passes to step 202 (step 236).

If an underflow occurs in the jitter buffer in endpoint A (step 234) then either the last packet is replayed or a silence is played. Typically, in the event of a jitter buffer underflow, the last RTP packet is replayed. If the underflow persists, a silence is then played. In either case, an indication is sent in the packet to endpoint B indicating that a packet was replayed or a silence was played.

If the packet is replayed (step 240), then rx_timestamp_counter is set to the value of rx_packet_timestamp, rx_offset is set to zero and the synchronization flag is set (step 246). These values are placed in the RTP header extensions. The first sample from the received RTP packet is then replayed (step 248). The method continues with step 226.

If the a silence is played, then rx_timestamp_counter, rx_sequence and rx_offset variables are all set to zero and the synchronization flag is set (step 242). These values are updated to reflect the fact that a silence was played. These values are then placed in the RTP header extension. A silence is then played (step 244). The method continues with step 226.

A complementary process running on the recording device is operative to notice a nonlinear change in the timestamp increment or a nonsequential sequence number (depending on whether the timestamp or sequence indication method is used) and is able to deduce from that what was actually played.

In the event the last packet(s) (or samples) is replayed or a silence is played, the RTP packet that endpoint A is currently filling is sent immediately regardless of whether the payload portion of the packet has been completely filled (step 226) and the processor starts filling a new RTP packet (steps 228, 230, 232). Note that in an alternative method, a check is made if silence is played more then once in a row, and if so, the device plays silence and continues with step 212 rather than step 242. Note that alternatively, other types of indications beside the timestamp method and the sequence methods may be used without departing from the scope of the present invention.

Figure 9:
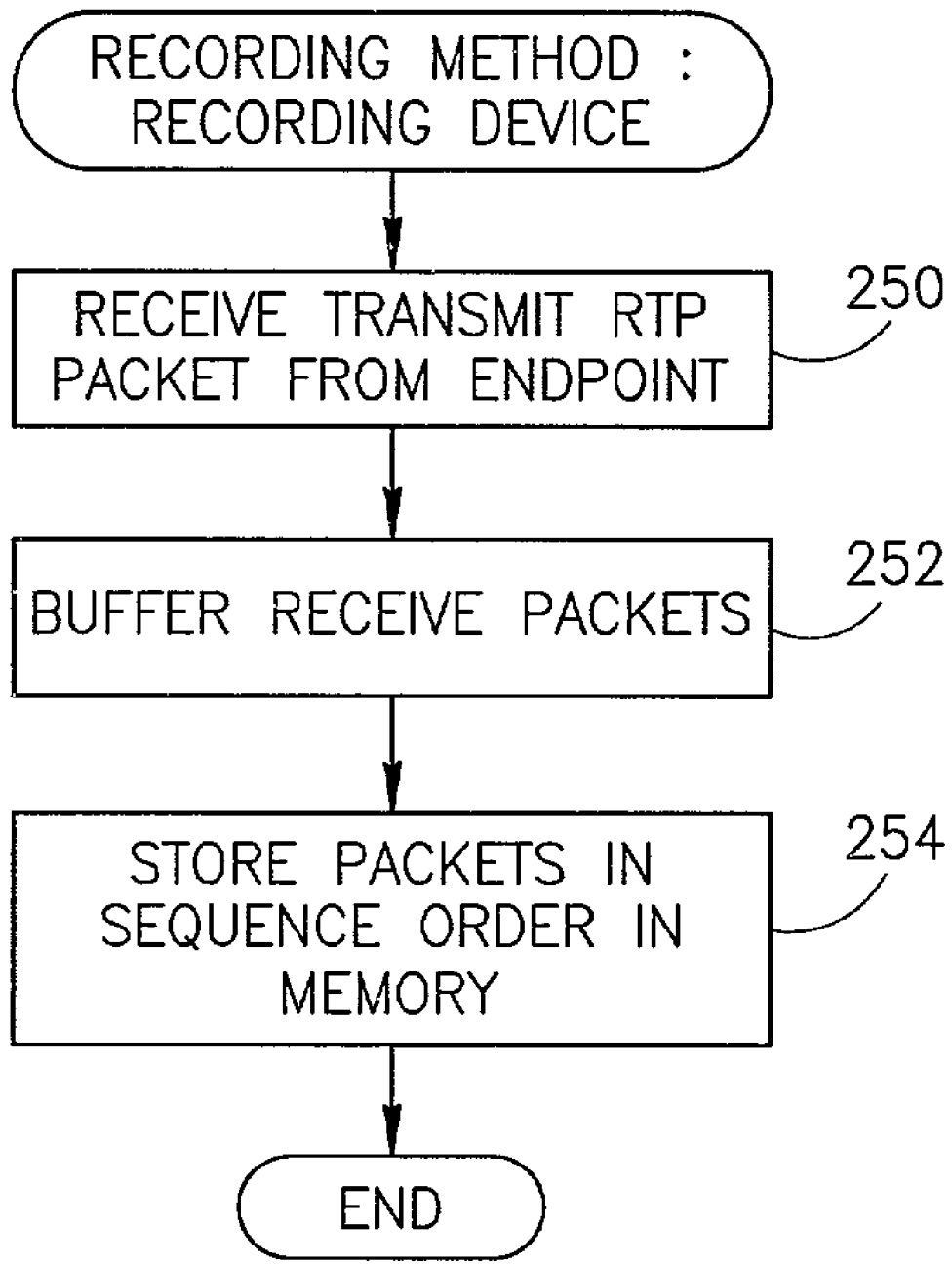
FIG. 9 is a flow diagram illustrating the recording method of the present invention performed on the recording device.

A flow diagram illustrating the recording method of the present invention performed on the recording device is shown in FIG. 9. As described above, the recording device is adapted to receive packet streams transmitted from one or more endpoints (step 250). The packets received are buffered, if necessary (step 252) before being stored in sequence order in memory (step 254). The memory comprises any suitable storage media including but not limited to hard disk, RAM, NVRAM, Flash memory, magnetic tape, etc.

Figure 10:
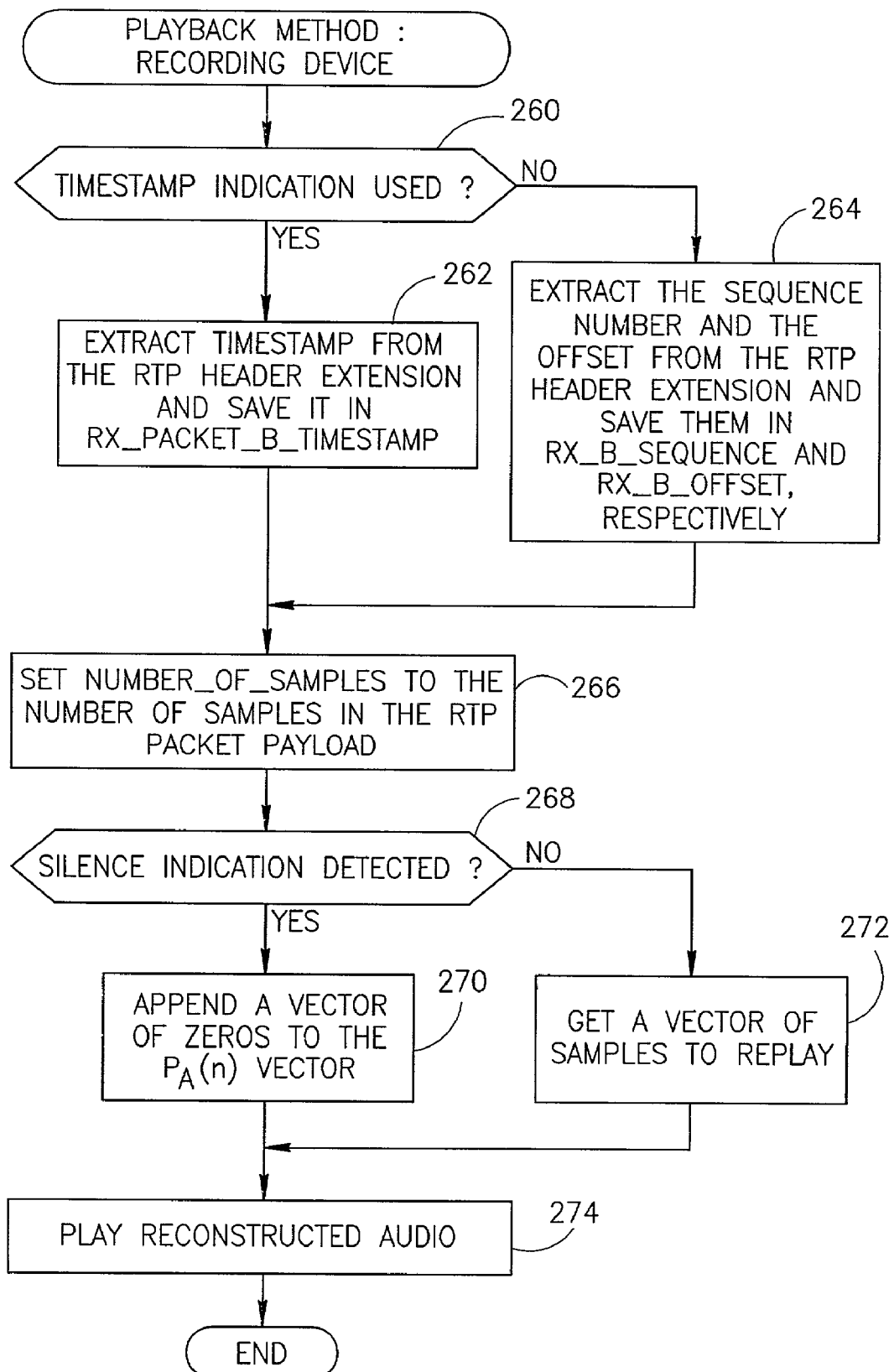
FIG. 10 is a flow diagram illustrating the playback method of the present invention performed on the recording device.

A flow diagram illustrating the playback method of the present invention performed on the recording device is shown in FIG. 10. This method is performed when the recording device is requested to play back the audio that was played on one or the endpoints. To play back the audio generated on an endpoint, the sample contents of the RTP packet in order of RTP packet time are retrieved and played back.

To play back the audio played (i.e. heard) on an endpoint, the following method is used. The method is described from the perspective of the processing performed by the recording device to play back the audio heard on endpoint A. Note, that a similar method is performed to reconstruct the audio heard on endpoint B.

Initially, either the timestamp or the sequence number and offset (depending which indication method is used) is extracted from the header extension portion of the RTP packets received from the endpoint (endpoint A). In particular, if the timestamp indication is used (step 260), then the timestamp is extracted from the RTP header extension and saved in rx_packet_B_timestamp (step 262). If the sequence number and offset indication is used (step 260), then the sequence number and offset are extracted from the RTP header extension and saved in rx_B_sequence and rx_B_offset, respectively (step 264).

The number of samples in the RTP packet is then calculated (step 266). In particular, the number_of_samples is set to the payload size of the RTP packet divided by the sample size. It is then determined whether a silence was played (step 268). A silence was played if the timestamp indication was used and rx_packet_B_timestamp equals zero OR the sequence number indication was used and rx_B_sequence equals zero. If a silence was played (step 268), then a vector of zeros having a length equal to number_of_samples is appended to the reconstructed $P_A(n)$ vector (step 270).

If the extracted timestamp or sequence number (depending on the indication method) is not zero (step 268), then the timestamp or sequence number/offset is a pointer to the sample that was played by endpoint A when the first sample in the RTP packet was recorded. If the timestamp indication was used, a vector of sequential samples having a length equal to the number_of_samples, whose first sample is associated with the timestamp rx_packet_B_timestamp, is extracted and appended to reconstructed $P_A(n)$ vector (step 272). If the sequence number/offset indication was used, the sequence number is rx_B_sequence and the offset within the packet equal to rx_B_offset comprise the pointers to the first sample of the appended vector.

Note that since the recording device now knows precisely which sample was played when the first sample in the packet was recorded by endpoint A, it also knows whether the jitter buffer in endpoint A underflowed and whether endpoint A has replayed any packets or samples. The recording device also knows that if the received RTP packet contains N samples, then endpoint A played N sequential samples beginning with the first played sample during the recording of those N samples. This is true because the endpoint sends the current RTP packet even if it is not full and begins filling a newly allocated packet when the stream of played samples becomes non-sequential (see steps 246, 248, etc.)

The recording device has knowledge of the timing and the contents of the particular packet that was played by endpoint A at a point in time corresponding to the generation of the data samples by endpoint A since the sampling rate and timing are known and since the packets recently sent to endpoint A are stored by the recording device. The recording device can now reconstruct the audio signal heard at endpoint A using its knowledge of the data samples played on endpoint A (step 274).

Note that preferably, a reliable communications protocol is used to send packets from the endpoints to the recording device. This prevents packets from getting lost on their way to the recording device. Note also that the method assumes that the sample rate for the data samples from both endpoints is known by the recording device. The sampling rate for each endpoint may be different as long as the recording device and both sides of the connection know the other's sampling rate.

Note that this also assumes that the timestamp clock rate of each endpoint is known to the other endpoint and to the recording device. The timestamp clock rate for each endpoint may be different as long as both sides of the connection and the recording device know the timestamp clock rate of the other.

The present invention may be applied to protocols other than H.323 such as the Session Initiation Protocol (SIP) proposed by the Internet Engineering Task Force (IETF). The SIP is an application-layer control/signaling protocol for creating, modifying and terminating sessions with one or more participants. The sessions include Internet multimedia conferences, Internet telephone calls and multimedia distribution. The protocol provides for both unicast and multicast messages. Similar to H.323, SIP is designed to be independent of the lower layer transport protocol and can be extended with additional capabilities.

Note that in an alternative embodiment, rather than use the timestamp in the RTP packet, the invention may utilize sequence numbers combined with the receive sample offset within the RTP packet to uniquely identify a sample that was played.

Note that the RTP header extension must be included in RTP packets sent to the recording device. The RTP header extension may, however, be omitted from RTP packets sent to the remote endpoint since the remote endpoint has no use for the indication carried therein.

Note that the timestamp clock in the endpoints may or may not be equal to the sampling rate. If the timestamp rate is greater than the sampling rate, than each sample has a unique timestamp. If, however, the timestamp rate is less than the sampling rate, than several samples have the same timestamp and cannot be uniquely identified. Preferably, to achieve optimal play back results, the timestamp clock should be greater than or equal to the sampling rate.

In the event the RTP packets are compressed, the endpoints must be adapted to decompress them before performing the method of the present invention. All references (i.e. pointers) are to uncompressed samples.

Note that some endpoints, when they detect that their end user is silent, send an RTP packet to the remote endpoint with an indication that their user is silent and then stop sending packets until their user starts to speak again. In the present invention, a copy of this RTP packet is sent to the recording device as well, and in response, the recording device saves this packet. If endpoint B is such an endpoint, then endpoint A, when it encounters the indication from endpoint B that user B is silent, is operative to behave as if there is a jitter buffer underflow and plays either silence or comfort noise towards end user A.

It places an indication that a silence or comfort noise was played in the RTP packet extension it sends to the recording device. The comfort noise is a weak noise signal meant to give the end user (user A in this case) the feeling that the connection is alive and that the remote user is still connected although they are silent. When the recording device reconstructs the signal that was played to end user A, it behaves as endpoint A does, i.e. either plays a silence or a comfort noise.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A pseudo four-channel recording method for use in a packet telephony system, said system including a first endpoint, second endpoint and a recording device, said method comprising the steps of:

generating data samples on said first endpoint corresponding to a first audio signal and generating data samples on said second endpoint corresponding to a second audio signal;

tracking a second timestamp of data samples originating from said second endpoint that are played by said first endpoint and tracking a first timestamp of data samples originating from said first endpoint that are played by said second endpoint;

sending a first stream of packets from said first endpoint to said recording device, said first stream of packets containing data samples generated by said first endpoint, a first timestamp corresponding thereto and the second timestamp corresponding to data samples from said second endpoint played by said first endpoint at that moment in time;

sending a second stream of packets from said second endpoint to said recording device, said second stream of packets containing data samples generated by said second endpoint, a second timestamp corresponding thereto and the first timestamp corresponding to data samples from said first endpoint played by said second endpoint at that moment in time; and recording said first stream of packets and said second stream of packets representing the signals generated and played on said first endpoint and said second endpoint, respectively.

2. The method according to claim 1, wherein said packets comprise Real-Time Transport Protocol (RTP) packets.

3. The method according to claim 1, wherein said packet telephony system is constructed in accordance with the International Telecommunications Union (ITU) H.323 protocols.

4. The method according to claim 1, wherein said packet telephony system is constructed in accordance with the Internet Engineering Task Force (IETF) Session Initiation Protocol (SIP).

5. The method according to claim 1, further comprising the step of compressing said first stream of packets and said second stream of packets before transmitting them to said recording device.

6. The method according to claim 1, further comprising the step of decompressing said first stream of packets and said second stream of packets wherein pointer references to data samples are to uncompressed samples.

7. The method according to claim 1, wherein a timestamp clock rate associated with an endpoint with is greater than or equal to a data sample clock rate.

8. The method according to claim 1, wherein said first endpoint has knowledge of the sampling rate used by said second endpoint and said second endpoint has knowledge of the sampling rate used by said first endpoint and said recording device has knowledge of sampling rate used by said first endpoint and said second endpoint.

9. The method according to claim 1, wherein said first timestamp and said second timestamp comprise a packet sequence number and a sample offset within said packet.

10. The method according to claim 1, further comprising the step of playing back the audio generated on an endpoint utilizing the samples conveyed in a packet stream transmitted to said recording device.

11. The method according to claim 1, further comprising the step of playing back the audio played on an endpoint utilizing a combination of an indication transmitted from one endpoint and the samples transmitted from another endpoint.

12. The method according to claim 1, further comprising the step of synchronizing said first packet stream and said second packet stream received by said recording device.

13. A pseudo four-channel recording method for use in a packet telephony system, said system including a first endpoint, second endpoint and a recording device, said method comprising the steps of:

generating data samples on said first endpoint corresponding to a first audio signal and generating data samples on said second endpoint corresponding to a second audio signal;

tracking a second timestamp of data samples originating from said second endpoint that are played by said first endpoint and tracking a first timestamp of data samples originating from said first endpoint that are played by said second endpoint;

recording a first stream of packets at said first endpoint, said first stream of packets containing data samples generated by said first endpoint, a first timestamp corresponding thereto and the second timestamp of data samples from said second endpoint played by said first endpoint at that moment in lime; and recording a second stream of packets at said second endpoint, said second stream of packets containing data samples generated by said second endpoint, a second timestamp corresponding thereto and the first timestamp of data samples from said first endpoint played by said second endpoint at that moment in time,.

14. The method according to claim 13, wherein said packets comprise Real-Time Transport Protocol (RTP) packets.

15. The method according to claim 13, wherein said packet telephony system is constructed in accordance with the International Telecommunications Union (ITU) H.323 protocols.

16. The method according to claim 13, wherein said packet telephony system is constructed in accordance with the Internet Engineering Task Force (IETF) Session Initiation Protocol (SIP).

17. The method according to claim 13, further comprising the step of compressing said first stream of packets and said second stream of packets before recording them.

18. The method according to claim 13, further comprising the step of decompressing said first stream of packets and said second stream of packets wherein pointer references to data samples are to uncompressed samples.

19. The method according to claim 13, wherein a timestamp clock rate associated with an endpoint with is greater than or equal to a data sample clock rate.

20. The method according to claim 13, wherein said first endpoint has knowledge of the sampling rate used by said second endpoint and said second endpoint has knowledge of the sampling rate used by said first endpoint.

21. The method according to claim 13, wherein said first timestamp and said second timestamp comprise a packet sequence number and a sample offset within said packet.

22. The method according to claim 13, further comprising the step of playing back the audio generated on an endpoint utilizing the samples conveyed in a packet stream transmitted to said recording device.

23. The method according to claim 13, further comprising the step of playing back the audio played on an endpoint utilizing a combination of an indication transmitted from one endpoint and the samples transmitted from another endpoint.

24. The method according to claim 13, further comprising the step of collecting and matching call records associated with said first endpoint with call records associated with said second endpoint.

25. The method according to claim 1, further comprising the step of placing a first indication in said first stream of packets sent to said recording device, said first indication operative to specify whether a packet, several packets, several sequential samples from the same packet or several sequential samples from different packets received by said first endpoint were replayed or that a silence was played.

26. The method according to claim 1, further comprising the step of placing a second indication in said second stream of packets sent to said recording device, said second indication operative to specify whether a packet, several packet or several sequential samples from the same packet or several sequential samples from different packets received by said second endpoint were replayed or that a silence was played.

27. The method according to claim 13, further comprising the step of placing a first indication in said first stream of packets operative to specify whether a packet, several packets, several sequential samples from the same packet or several sequential samples from different packets received by said first endpoint were replayed or that a silence was played.

28. The method according to claim 13, further comprising the step of placing a second indication in said second stream of packets operative to specify whether a packet, several packets, several sequential samples from the same packet or several sequential samples from different packets received by said second endpoint were replayed or that a silence was played.

* * * * *